UNITED STATES PATENT OFFICE.

CHARLES GUSTAF JOHNSON, OF HELMETTA, NEW JERSEY.

LINIMENT.

SPECIFICATION forming part of Letters Patent No. 572,898, dated December 8, 1896.

Application filed June 8, 1895. Serial No. 552,138. (No specimens.)

*To all whom it may concern:*

Be it known that I, CHARLES GUSTAF JOHNSON, a citizen of the United States, residing at Helmetta, in the county of Middlesex and State of New Jersey, have invented certain new and useful Improvements in Liniments; and I do declare the following to be a full, clear, and exact description of the invention, such as will enable others skilled in the art to which it appertains to make and use the same.

My invention has for its object to produce a liniment for sores and bruises and which has been found to be highly efficacious in cases of burns; and the invention consists in the liniment produced as hereinafter particularly described, after which the invention will be sought to be specifically defined by the claim.

In making the liniment I take a quantity of horse-manure, say, in bulk, sufficient to fill a thirty-four-gallon vessel, and cover it with water sufficient to submerge it, and then let it stand for a period of one week, or thereabout, until the water has thoroughly permeated the bulk of manure and percolated through all its particles. I then remove the thoroughly soaked and saturated manure and subject it to a heavy pressure between rolls or plates, so as to expel from it the fluid extract of manure. This fluid extract, which is a dark brown color, is then filtered and next subjected to a boiling operation in a suitable kettle until its bulk is reduced about one-third and the product assumes a viscous consistence with a slightly-unctious feel. To every quart of this viscous and unctious compound I add two ounces of sulfuric acid and let it stand for a period of about twenty-four hours. I then add to every quart of the decoction one quart of alcohol and one quart of spirits of salt or hydrochloric acid. The decoction is then allowed to stand or is decanted until it becomes clear, after which I add from two to three drams of aqua-fortis or weak nitric acid to every quart of the compound, and the liniment thus formed is then ready for use. It is applied locally to the part affected by means of a camel's-hair brush or other suitable brush at intervals of five minutes, or thereabout, until four or five applications have been made. Surgeons' cotton is then placed over the affected part and a bandage applied. The operation is repeated the next day and, if necessary, again the following day until the wound has entirely healed.

In cases of burns the liniment is found to prevent blistering and to quickly alleviate the pain and in a short time remove all inflammation and cause the part to quickly heal. Upon removal of the bandage after the expiration of twenty-four hours a fine dry powder is found to be deposited upon the part to which the liniment was applied, the inflammation to have disappeared, and the affected part to have begun to heal, if not entirely healed.

In cases of scalding and where the skin is not broken it is not necessary to bandage the affected parts, as it is sufficient simply to paint the parts with the liniment, and it will be found that the parts will quickly heal and the natural color of the skin be restored in the course of a day or two.

Having described my invention and set forth its merits, what I claim is—

The liniment described composed of the fluid extract of manure brought to a viscous consistency, sulfuric acid, alcohol, hydrochloric acid, and nitric acid, substantially in the proportions set forth.

In testimony whereof I affix my signature in presence of two witnesses.

CHARLES GUSTAF JOHNSON.

Witnesses:
WM. H. BROOKS,
JOHN A. JOHNSON.